United States Patent [19]

Albers et al.

[11] Patent Number: 5,400,141
[45] Date of Patent: Mar. 21, 1995

[54] METHOD AND SYSTEM FOR MINIMIZING ANGULAR RANDOM WALK OR BIAS IN A RING LASER GYROSCOPE THROUGH THE USE OF TEMPERATURE BASED CONTROL

[75] Inventors: Steve Albers, Shoreview, Minn.; Andrew J. Karpinski, Jr., Clearwater, Fla.

[73] Assignee: Honeywell Inc., Minneapolis, Minn.

[21] Appl. No.: 115,196

[22] Filed: Aug. 31, 1993

[51] Int. Cl.6 ............................................. G01C 19/66
[52] U.S. Cl. ..................................... 356/350; 372/94
[58] Field of Search .................. 356/350; 372/94, 34

[56] References Cited

U.S. PATENT DOCUMENTS

| | | | |
|---|---|---|---|
| 4,152,071 | 5/1979 | Podgorski | 356/350 |
| 4,267,478 | 5/1981 | Ljung et al. | 356/350 |
| 4,740,083 | 4/1988 | Curby et al. | 356/350 |

Primary Examiner—Samuel A. Turner
Attorney, Agent, or Firm—Craig J. Lervick

[57] ABSTRACT

A system and method is provided which minimizes angular random walk or bias occurring in ring laser gyroscopes as a result of temperature changes. Temperature is known to affect components in a ring laser gyroscope in a manner which increases angular random walk or bias. By detecting temperature and causing movable path length transducers to move mirrors in the gyroscope into a position previously determined for a given temperature, angular random walk or bias is minimized for the given temperature.

22 Claims, 5 Drawing Sheets

METHOD AND SYSTEM FOR MINIMIZING ANGULAR RANDOM WALK OR BIAS IN A RING LASER GYROSCOPE THROUGH THE USE OF TEMPERATURE BASED CONTROL

CROSS REFERENCE TO RELATED APPLICATIONS

This application is related to application Ser. No. 08/115,190 concurrently filed herewith.

FIELD OF THE INVENTION

This invention relates a system and method of minimizing angular random walk in a ring laser gyroscope by sensing temperature, and changing the path of laser beams in the ring laser gyroscope in response to the sensed temperature to minimize angular random walk and stabilize bias. The invention also relates to a system and method of minimizing bias while stabilizing angular random walk in response to sensed temperature.

BACKGROUND OF THE INVENTION

In present technology wherein ring laser gyroscopes are employed in guidance systems, those of ordinary skill in the art recognize that, if there is any scattering within the lasing cavity of a ring laser gyroscope so that a portion of one of the counter-rotating laser beams couples into the other beam, there is a tendency for the phases of the two beams to pull towards each other. This pulling effect is most apparent when the frequencies and phases of the two laser beams travelling in opposite directions within the same cavity are close to each other, such as when the input rate approaches zero. This pulling of the frequencies and the phases of the two beams towards each other, frequently referred to as lock-in, results in an error in the output of the gyroscope.

One means available in the prior art to reduce this pulling between the beams is to modulate the ring laser gyroscope about its input axis in a periodic fashion. This modulation is frequently referred to as dither, as disclosed in J. E. Killpatrick U.S. Pat. No. 3,373,650 issued Mar. 19, 1968, and assigned to the same assignee as that of the present invention. In the patent there is disclosed that the dither motion reduces the lock-in effect the majority of the time. A further development in the dither technique is disclosed in U.S. Pat. No. 3,467,472, also issued to J. E. Killpatrick and assigned to the same assignee as that of the present invention, which teaches that the error due to lock-in can be further reduced by randomizing the oscillation or dithering of the beams so that the small errors at the extremities of the oscillation are no longer cumulative. However, those of ordinary skill in the art will recognize that, even with the significant benefits derived from the utilization of the teachings of U.S. Pat. Nos. 3,373,650 and 3,467,472, there is still a small error in the angular output of the ring laser gyroscope which manifests itself as a drift with the characteristics of a statistical random walk. This angular random walk error, of necessity, affects the accuracy of the measurements being conducted.

T. J. Podgorski U.S. Pat. No. 4,152,071, issued May 1, 1979 and assigned to the same assignee as that of the present invention, discloses that random walk can be reduced by shifting the position of the mirrors in the gyroscope so as to change the position of the path that the laser beams traverse within the lasing cavity of the ring laser gyroscope. By shifting the position of some of the mirrors, for example, one mirror can be shifted inwardly while another can be shifted outwardly, it is possible to reduce the random drift or angular random walk of the gyroscope while maintaining the same laser path length. This is accomplished because the new path that the laser beams traverse moves the beams away from any sources of scatter within the lasing cavity.

Though the technique disclosed in U.S. Pat. No. 4,152,071, generally serves to reduce the random drift of a ring laser gyroscope, those of ordinary skill in the art will recognize that the technique has certain limitations. For example, the discriminant signal, referred to as the single beam signal or the AC component of the laser power signal, which is used to determine whether the gyroscope is operating at a minimum in angular random walk, as discussed in U.S. Pat. No. 4,152,071, is only modulated in a readily measurable manner if the ring laser gyroscope experiences a zero input rate in a periodic manner. For example, if the input rate applied to the ring laser gyroscope does not exceed the peak dither rate, then the ring laser gyroscope will experience such zero input rate in a periodic manner. However, if the ring laser gyroscope does not experience zero input rate for a sufficiently long time, then the techniques discussed will not work.

It will also be apparent to those of ordinary skill in the art that, since real gyroscopes are not ideal, all gyroscopes indicate a non-zero output for zero input rate. This non-zero output is referred to as bias. This bias is not a major problem if it is constant for all conditions, since it can be compensated for. However, it has been discovered that the bias in the output of a ring laser gyroscope may change with changes in the above-mentioned single beam signal. This indicates that there is a different gyroscope bias associated with each potential path that the laser beams may traverse within the lasing cavity, since each of these paths result in a different scatter of one of the beams into the other giving a different resulting single beam signal. It has also been discovered that this single beam signal and the angular random walk of a ring laser gyroscope change with changes in the gyroscope temperature. Consequently, controlling the position of the path that the laser beams traverse within the lasing cavity for a constant angular random walk, with the minimum being an example of a constant random walk, also minimizes the changes in the gyroscope bias. As an additional consequence, controlling for a constant angular random walk over temperature also results in a minimum variation in the gyroscope bias. Further, certain specific paths for certain temperatures, when selected will result in minimized bias with a constant, though not necessarily minimum angular random walk.

Accordingly, in accordance with the invention, the problems of minimizing angular random walk and compensating for or minimizing bias in the referenced techniques are avoided by relying on temperature measurements to change the path, without changing the path length, of laser beams within a ring laser gyroscope in a predetermined and calculated manner.

SUMMARY OF THE INVENTION

In accordance with one aspect of the invention, there is provided a method of minimizing angular random walk in a ring laser gyroscope in operation. The gyroscope is of the type having mirrors associated with transducers for adjusting the position of mirrors in the gyroscope. The invention relies on the fact that changes in temperature cause expansion and contraction of components in the gyroscope. This changes angular random walk. The method compensates for temperature changes by first detecting the temperature of the ring laser gyroscope and generating a signal representative of the temperature detected. The signal is adjusted in a predetermined manner to result in a control signal for the mirror transducers for causing the mirror transducers to move the mirrors in the gyroscope into a position that has previously been determined to result in minimum angular random walk. Thereafter, the control signal is applied to the mirror transducers to cause movement of the mirrors into a position whereby angular random walk in the gyroscope is minimized for the temperature detected.

In another aspect, the invention is directed to a system for minimizing angular random walk in a ring laser gyroscope in operation. The gyroscope is of the type having at least three mirrors for redirecting the path of laser beams therein, at least two of the mirrors being mounted on selectively moveable transducers for changing the path of the laser beams. Temperature detectors are provided for detecting the temperature of the gyroscope and for generating a signal representative of the temperature. Control signal means then serve to receive the signal from the temperature detector and for converting the signal from the temperature detector into a control signal for causing the movable transducers to move the mirrors associated therewith into a position defining a path for the laser beams, wherein angular random walk is minimized for the detected temperature.

In more specific aspects, both for the method and the system, the control signal is generated by a look-up memory having data stored therein representative of drive signals necessary for the transducers to cause movement thereof into a position resulting in minimum angular walk.

In another aspect, the control signal means is an amplifier having a pre-calibrated gain for generating the control signal in response to the temperature detected.

In yet still another aspect, the control signal means is a computer having a predetermined program stored therein for operating on the signal from the temperature detecting means in a predetermined manner to yield the control signal.

In the case where the noted look-up memory or a computer are employed, there are correspondingly arranged an analog-to-digital convertor before the input of either unit as well as a digital-to-analog converter at the output leading to the transducers.

Alternatively, the invention also includes a method and system for minimizing bias using the above-described techniques and components. In the case of minimizing bias, temperature can also be correlated to mirror positions which result in minimum bias. In the case where the mirrors are moved to a position of minimum bias, the angular random walk will also be stabilized, but is not necessarily at a minimum.

BRIEF DESCRIPTION OF THE DRAWINGS

Having generally described the invention, the same will become better understood from the following detailed discussion taken in conjunction with the appended drawings wherein.

DETAILED DISCUSSION OF THE INVENTION

Figure 1:
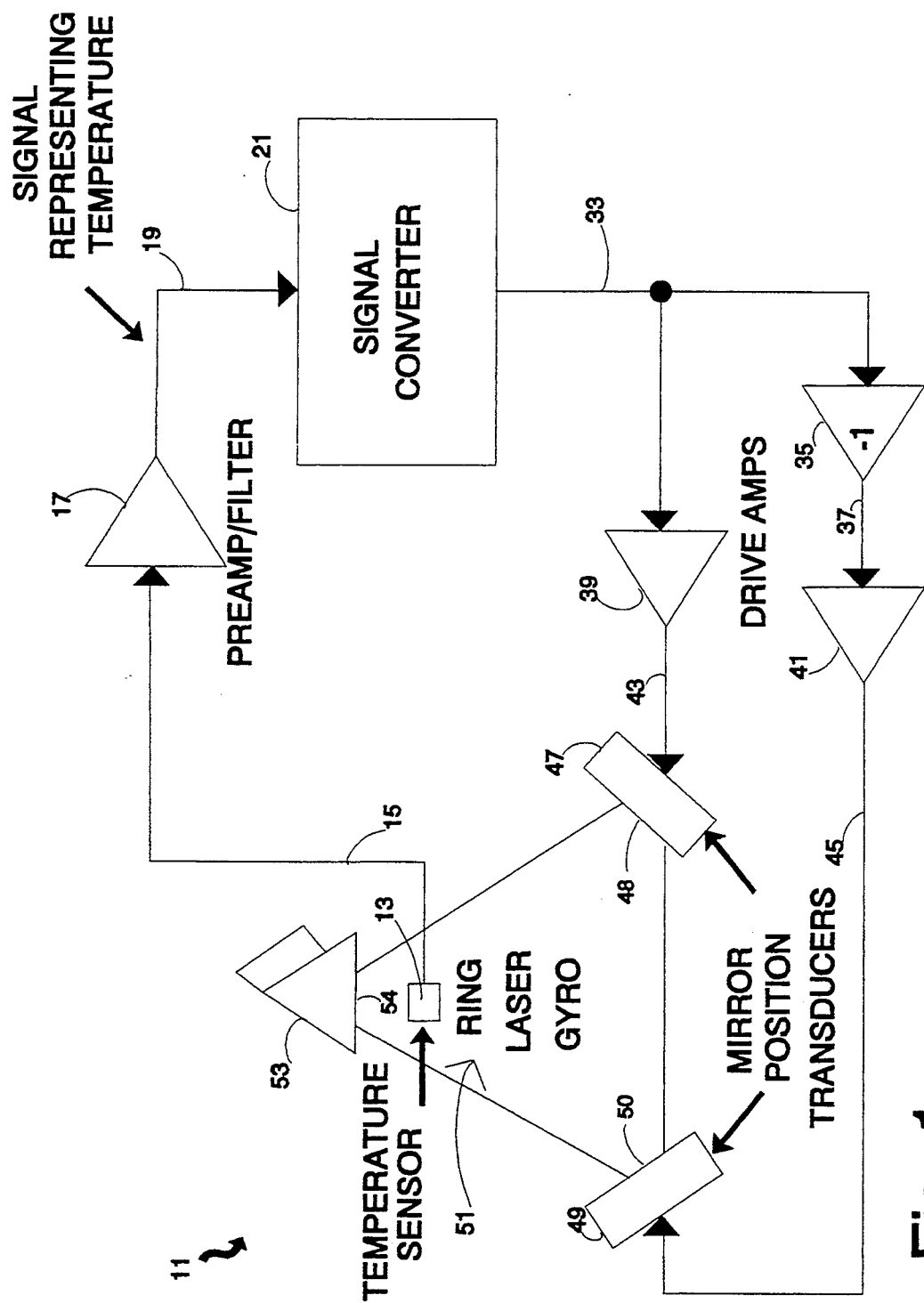
FIG. 1 is a schematic diagram of the invention generally showing the temperature detecting arrangement and control signal generator for the transducers thereof for moving two mirrors to change the path of laser beams within the ring laser gyroscope.

The system in accordance with the invention is generally illustrated in FIG. 1 and throughout the rest of the figures by reference numeral 11. As can be seen from FIG. 1, a ring laser gyroscope 51 of conventional construction includes a temperature sensor 13, likewise of conventional construction, for detecting temperature within the ring laser gyroscope. As temperature changes in the gyroscope 51, either by increasing or decreasing, components of the ring laser gyroscope 51 are likely to expand or contract. This affects the path of each laser beam travelling within the gyroscope 51 cavity.

In the system 11, in accordance with the invention, one ring laser gyroscope 51 within which the invention is implemented, is a three-sided gyroscope including mirrors arranged at each corner. At two of the corners mirrors 48 and 50 associated with mirror position transducers 47 and 49, which are selectively moveable in accordance with a control signal supplied thereto. At the third corner of the ring laser gyroscope 51 is arranged a mirror 54 with a power detector photodiode 53 which is connected to other electronics (not shown) in the manner disclosed in co-pending application Ser. No. 08/115,190. The additional electronics are not discussed further herein, although reference is made to said application whose disclosure is incorporated by reference herein for the details thereof. The temperature sensor 13 is connected by lead 15 to a preamplifier/filter 17 which conditions the signal, which is indicative of sensed temperature, in a conventional manner and transmits the signal through line 19 to a signal convertor 21. In the signal convertor 21 the signal from the temperature sensor 13 is processed in a predetermined manner, as discussed hereafter, to result in a control signal at line 33 which is transmitted through drive amplifiers 35, 39 and 41, and through lines 43 and 45, to control movement of mirror position transducers 47 and 49 and having mirrors 48 and 50 thereon.

The drive amplifiers 39 and 41 are of conventional construction. As may be appreciated, since the mirror 49 must be driven in a reverse direction from mirror 47, inverting amplifier 35 is provided which provides an inverted control signal through line 37 to drive amplifier 41. In this manner, the transducers 47 and 49 are caused to move in a manner corresponding to specific temperatures to change the paths of the laser beams in the ring laser gyroscope 51, in a manner to result in reduced angular random walk or reduced bias, as appropriate, for the temperature detected within the ring laser gyroscope 51.

Figure 2:
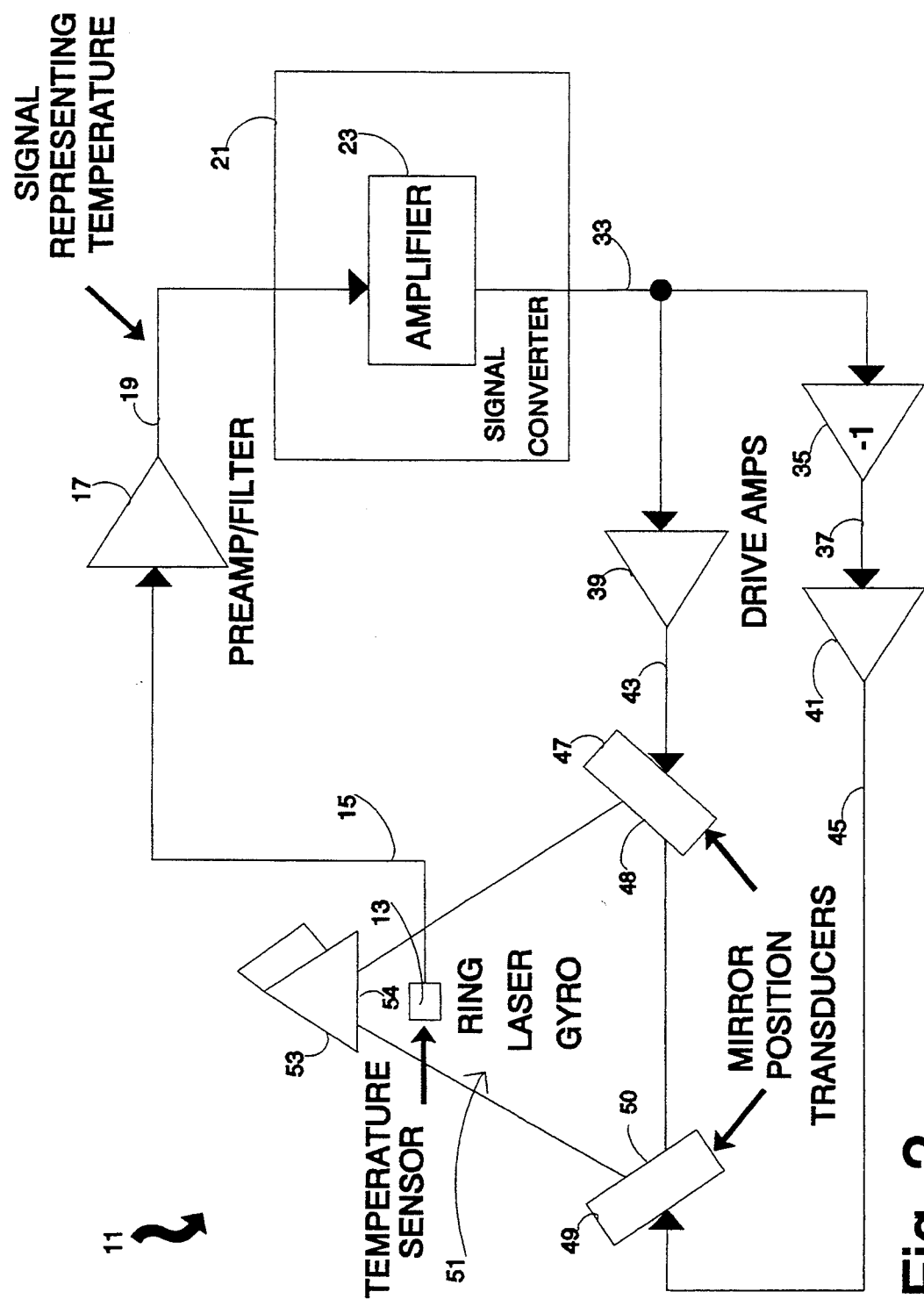
FIG. 2 is a drawing as in FIG. 1, specifically showing the implementation of the invention with an amplifier of predetermined gain set as part of calibration.

In one specific aspect of the invention as shown in FIG. 2, the signal convertor 21 consists of an amplifier 23 which is adjusted during calibration of the ring laser gyroscope 51 so that its output when amplified and applied to the mirror transducers 47 and 49, results in moving the mirrors associated with the transducers 47 and 49 into a position yielding minimum angular random walk or bias for detected temperature changes of concern.

While FIG. 2 represents the simplest implementation in accordance with the invention, because it can be implemented with very little hardware, it is difficult to implement a nonlinear gain that is necessary for best minimization of angular random walk or bias for all temperatures of operation. It is also difficult to adjust the nonlinear gain during calibration. Further, as the mirror position transducer parameters change over time, such changes are also difficult to accommodate. However, in its simplest form, this embodiment of the invention is particularly useful in low performance applications.

Figure 3:
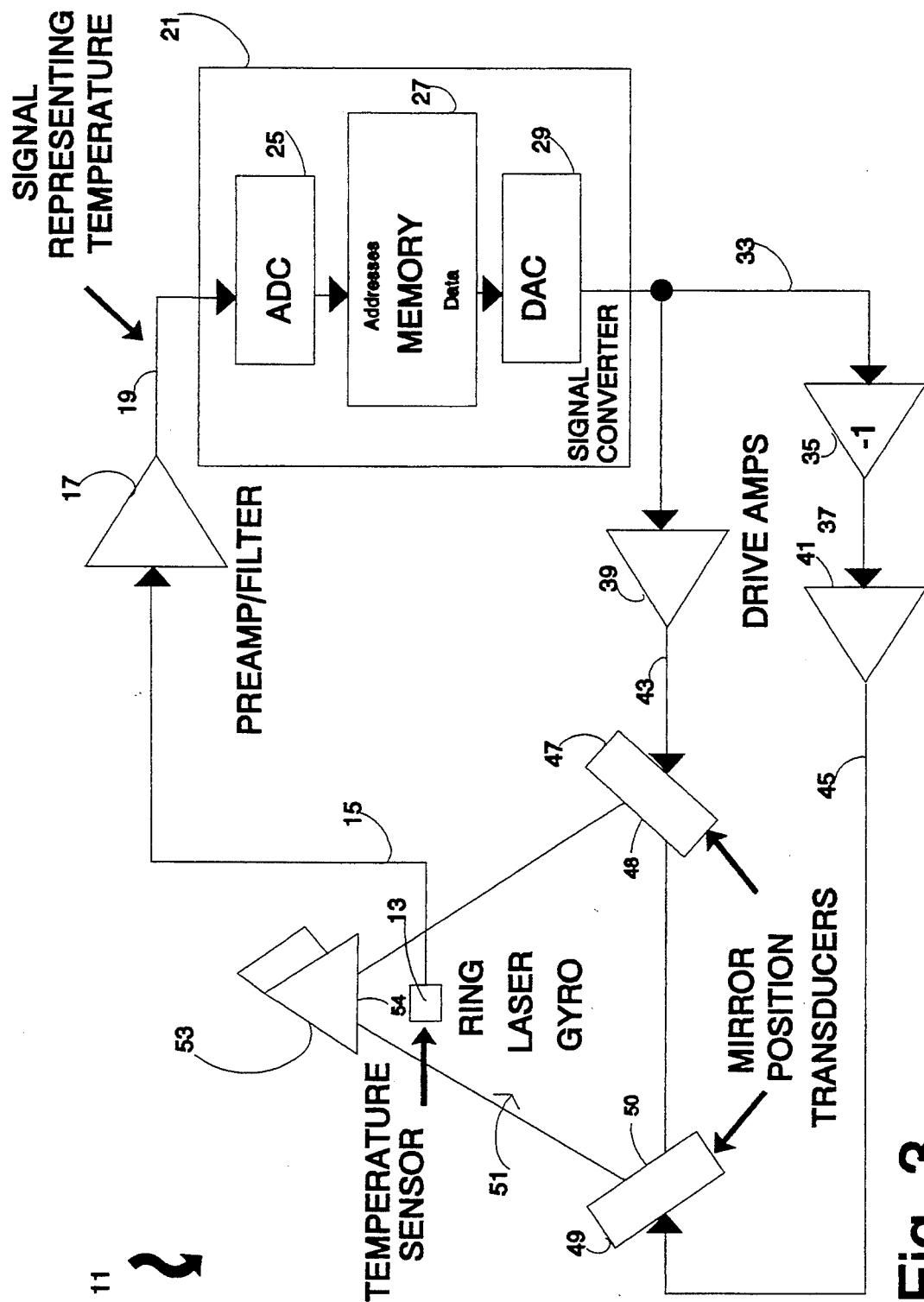
FIG. 3 illustrates the practice of the invention as in FIGS. 1 and 2, but showing the use of a pre-configured memory correlating temperature to predetermined control signals for controlling the movement of the transducers of the ring laser gyroscope.

An alternative, more sophisticated and more complex embodiment of the invention is illustrated in FIG. 3. Specifically, the output from the temperature sensor 13 in this embodiment is provided through line 19 to an analog-to-digital convertor 25 arranged within the signal convertor 21. After the analog signal from the temperature sensor 13 is converted into digital form at analog-to-digital convertor 25, it is passed to a memory 27 wherein it is mapped in digital form to a specific address in the digital memory 27. Stored at these addresses is data for generating a control signal for corresponding temperature signals input into memory 27. Specifically, a temperature profile can be stored in a memory, for example, a memory which is 256 bytes by 8 or 12 bytes. In such an embodiment, as will be appreciated by those of ordinary skill in the art, a 150° temperature range can be accommodated with an allocation of ⅔ of a degree per byte. Thus, depending upon the data location of the memory 27 to which the temperature signal is mapped, a control signal is generated and transmitted to digital-to-analog convertor 29 wherein it is converted into analog form and passed through line 33 to control the mirror position transducers 47 and 49.

In one embodiment of FIG. 3, the data in the memory represents the drive signal necessary for minimum angular random walk for each address which corresponds to the specific temperature in question. In another embodiment, the data in the memory represents the drive signal necessary for minimum bias for each address which corresponds to the specific temperature in question. This data is derived from system calibration at the time of calibration and while the system 11 of FIG. 3 requires more hardware than the system 11 of FIG. 2, it can easily accommodate complex and nonlinear relationships between temperature and the drive signal necessary. As a result, it may be appreciated that it can result in much better gyroscope performance than the embodiment of FIG. 2, but cannot accommodate changes in the transducers parameters over time.

Figure 4:
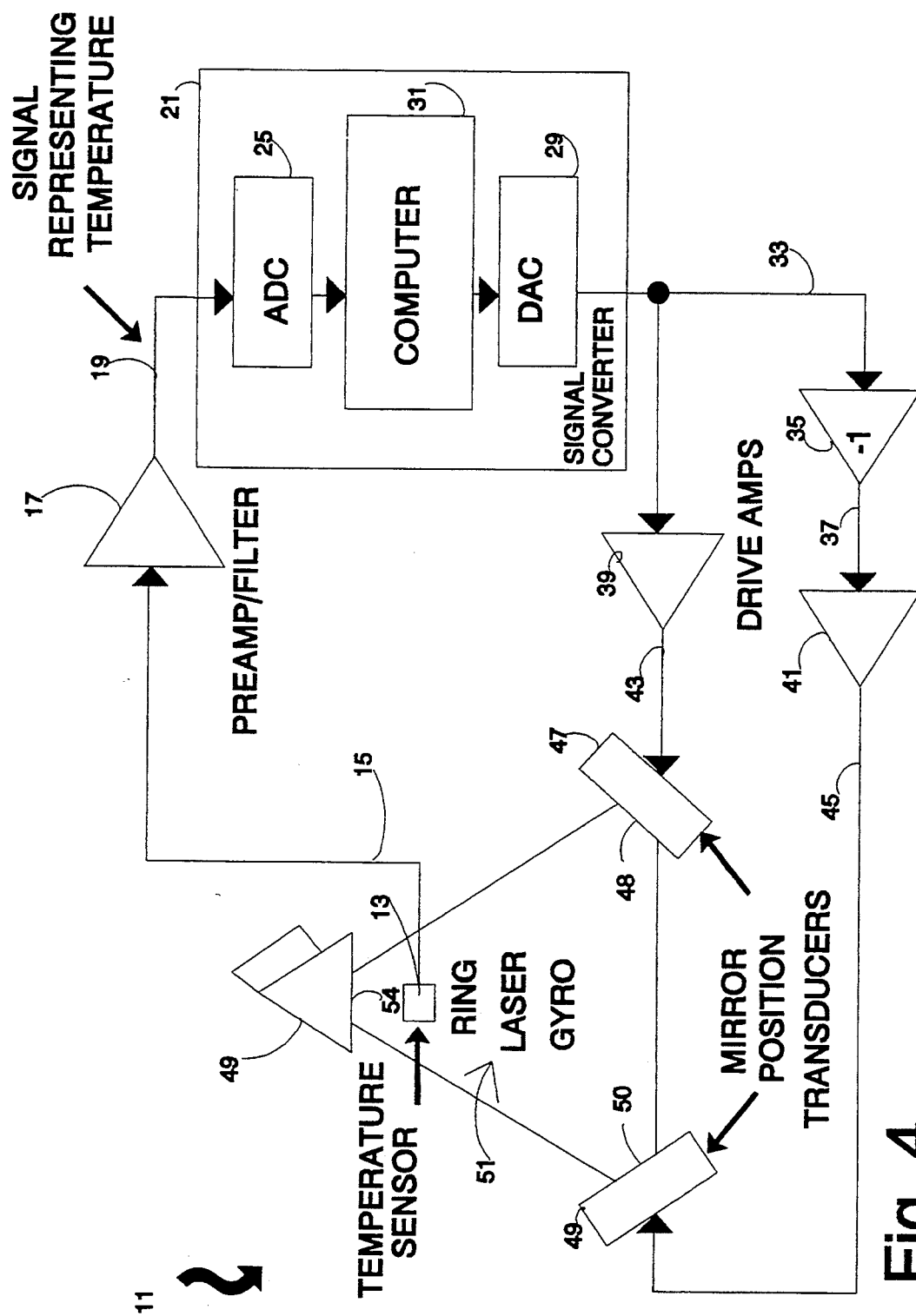
FIG. 4 illustrates the use of the invention with a computer having predetermined software for operating on signals representing temperature in a predetermined manner to result in the control signals.

Another embodiment in accordance with the invention is shown in FIG. 4, which shows the system 11 in its most complex embodiment. In this particular embodiment, the memory 27 is replaced with a computer 31 which has pre-stored in memory therein a program which operates on the incoming temperature signal. The program can be configured in a conventional manner, once knowledge of the invention is known. The computer 31 can operate to obtain the optimum drive signal versus temperature to apply to the mirror position transducers 47 and 49 by getting the signal from a look-up table in memory, or can generate the signal with a specific algorithm derived from calibration data to generate the necessary control signals.

As compared to the embodiment at FIG. 3, all of the advantages of the memory 27 embodiment are maintained, but it is also now possible to adjust the optimum drive signal determined during calibration for changes occurring as a result of change in parameters of the position transducers 47 and 49 over time.

Specifically, if the computer can read the gyroscope laser power, as disclosed in co-pending application Ser. No. 08/115,190, at power-up the drive voltage to the mirror position transducers 47 and 49 is swept while monitoring the laser power. The scale factor and initial offset of the mirror position transducers 47 and 49 are calculated from the data obtained from the sweep. Thereafter, the present day transducer parameters are compared to those when the gyroscope was calibrated and the optimum drive signal for each temperature is adjusted accordingly.

Figure 5:
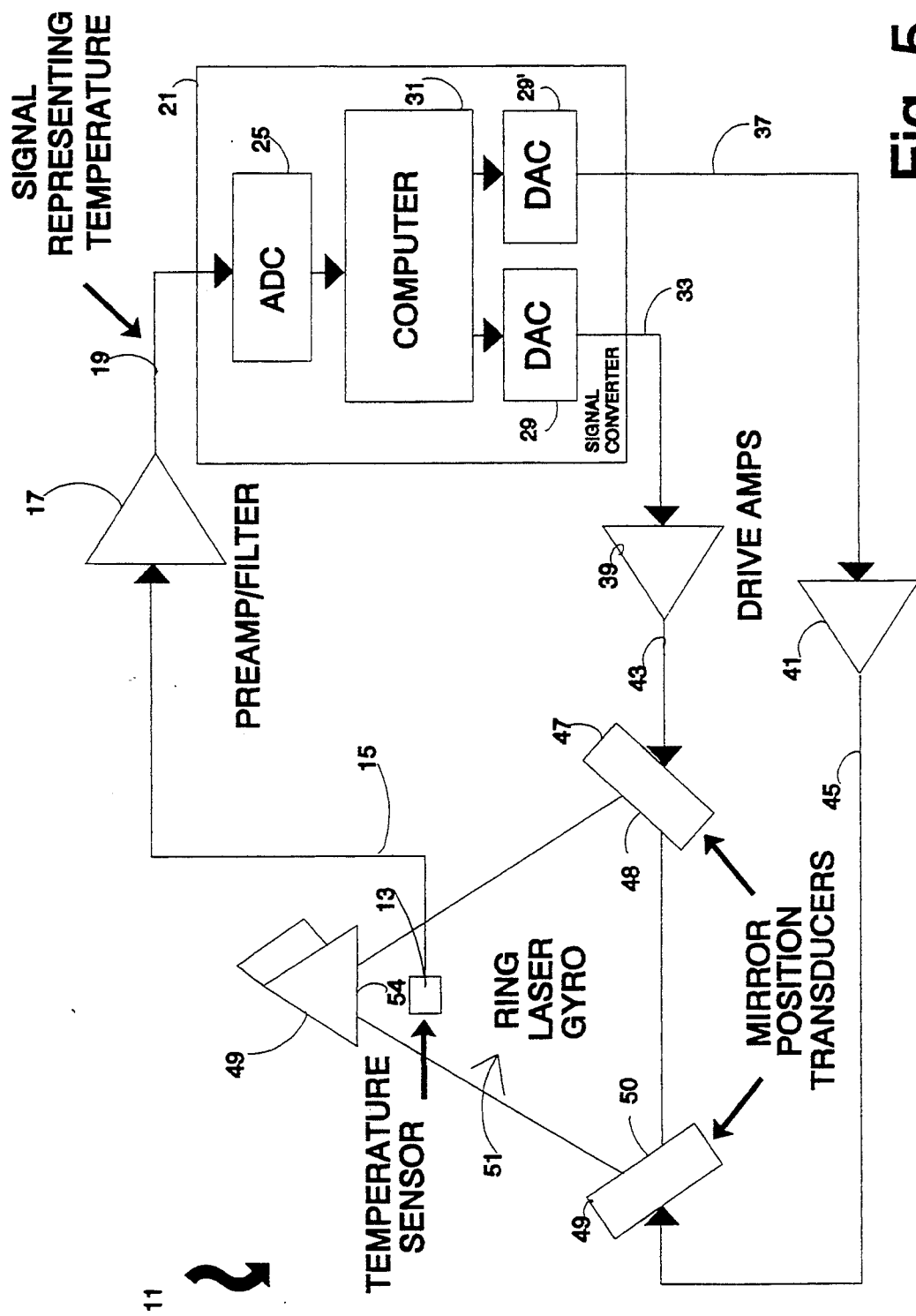
FIG. 5 illustrates the use of the invention with a computer in an alternative variation to that of FIG. 4.

FIG. 5 shows an alternative implementation similar to that of FIG. 4 except that two digital-to-analog convertors 29 and 29' are employed in place of the inverting amplifier 35. Digital-to-analog convertor 29 then drives amplifier 39 through line 33 and digital-to-analog convertor 29', which receives the inverse of the command to digital-to-analog convertor 29' drives amplifier 41 through line 37. The advantages provided by this implementation are that 1) the same computer and digital-to-analog convertors can be used for path length control, and 2) an offset can be applied to the path length control at power-up thereby ensuring acquisition of the same power mode, and thus, the same scale factor.

The invention has been primarily described with a view toward maintaining constant angular random walk, whether it is at a minimum or some other value. As noted, it is also possible to minimize variation in bias. Specifically, if it is desired to provide control for a constant bias, then the values for minimum angular random walk are selected at calibration. Alternatively, if it is desired to minimize bias, then calibration would be done for minimum bias and not minimum, but constant, angular random walk. This is done because in some applications minimizing bias is more important than minimizing random walk.

Having generally described the invention, same will be better understood from the appended claims which set forth the invention in a non-limiting manner.

What is claimed is:

1. A method of minimizing angular random walk in a ring laser gyroscope in operation, said gyroscope having mirror transducers for adjusting the position of mirrors in said gyroscope, comprising the steps of:
   detecting the temperature of the ring laser gyroscope and generating a signal representative of said temperature;
   adjusting said signal in a predetermined manner to result in control signal for said mirror transducers for causing said mirror transducers to move said mirrors in said gyroscope into a position that yields minimum angular random walk for the temperature detected; and applying said control signal to said mirror transducers to cause movement of said mirrors whereby angular random walk in said gyroscope is minimized for the temperature detected.

2. A method as in claim 1 wherein said signal representative of temperature is amplified by amplifying means having a pre-calibrated gain to yield said control signal.

3. A method as in claim 1 wherein said control signal is generated by:
converting said signal representative of temperature into a digital output;
applying said digital output to pre-stored addresses in memory containing data representative of the control signal necessary for minimum angular random walk for respective temperatures; and
generating said control signal from the address in memory selected from said complication of said digital output to cause said mirror transducers to move said mirrors into position for minimizing random walk.

4. A method as in claim 1 wherein said control signal is generated by:
converting said signal representative of temperature into a digital output;
applying said digital output to computing means as data to be operated on in a predetermined manner to generate a control signal for causing said mirror transducers to move said mirrors into a position sufficient to minimize random walk; and
transmitting said control signal to said mirror transducers to cause movement of said mirrors into the minimized random walk position.

5. A method as in claim 4 wherein said data is operated on through an algorithm which calculates the mirror position effective to minimize random walk from calibration data for said ring laser gyroscope.

6. A system for minimizing angular random walk in a ring laser gyroscope in operation, said gyroscope having at least three mirrors for redirecting the path of laser beams therein, at least two of said mirrors being mounted on selectively movable transducers for changing the path of laser beams in said gyroscope, comprising:
temperature detecting means for detecting the temperatures of said gyroscope and for generating a signal representative of said temperature; and
control signal means for receiving said signal from said temperature detecting means and for converting said signal from said temperature detecting means into a control signal for causing said movable transducers to move the mirrors associated therewith into a position defining a path for said laser beams wherein angular random walk is reduced for said detected temperature.

7. A system as in claim 6 wherein said control signal means comprises a look-up memory having data stored therein representative of drive signals necessary for said transducers for minimum angular random walk for corresponding temperatures.

8. A system as in claim 6 wherein said control signal means comprises amplifying means having a pre-calibrated gain for generating said control signal in response to temperature detection.

9. A system as in claim 6 wherein said control signal means comprises a computer having a predetermined program stored therein for operating on said signal from said temperature detecting means in a predetermined manner to generate said control signal.

10. A system as in claim 9 further comprising an analog to digital temperature detecting means and the input of said computer and a digital-to-analog converter arranged between the output of said computer and said selectively moveable transducers.

11. A system as in claim 7 further comprising an analog to digital converter arranged between said temperature detecting means and the input of said look-up memory and a digital-to-analog converter arranged between the output of said computer and said selectively movable transducers.

12. A method of minimizing bias in a ring laser gyroscope in operation, said gyroscope having mirror transducers for adjusting the position of mirrors in said gyroscope, comprising the steps of:
detecting the temperature of the ring laser gyroscope and generating a signal representative of said temperature;
adjusting said signal in a predetermined manner to result in control signal for said mirror transducers for causing said mirror transducers to move said mirrors in said gyroscope into a position that yields minimum bias for the temperature detected; and
applying said control signal to said mirror transducers to cause movement of said mirrors whereby bias in said gyroscope is minimized for the temperature detected.

13. A method as in claim 12 wherein said signal representative of temperature is amplified by amplifying means having a pre-calibrated gain to yield said control signal.

14. A method as in claim 12 wherein said control signal is generated by:
converting said signal representative of temperature into a digital output;
applying said digital output to pre-stored addresses in memory containing data representative of the control signal necessary for minimum bias for respective temperatures; and
generating said control signal from the address in memory selected from said complication of said digital output to cause said mirror transducers to move said mirrors into position for minimizing bias.

15. A method as in claim 12 wherein said control signal is generated by:
converting said signal representative of temperature into a digital output;
applying said digital output to computing means as data to be operated on in a predetermined manner to generate a control signal for causing said mirror transducers to move said mirrors into a position sufficient to minimize bias; and
transmitting said control signal to said mirror transducers to cause movement of said mirrors into the minimized bias position.

16. A method as in claim 15 wherein said data is operated on through an algorithm which calculates the mirror position effective to minimize bias from calibration data for said ring laser gyroscope.

17. A system for minimizing bias in a ring laser gyroscope in operation, said gyroscope having at least three mirrors for redirecting the path of laser beams therein, at least two of said mirrors being mounted on selectively movable transducers for changing the path of laser beams in said gyroscope, comprising:

temperature detecting means for detecting the temperatures of said gyroscope and for generating a signal representative of said temperature; and control signal means for receiving said signal from said temperature detecting means and for converting said signal from said temperature detecting means into a control signal for causing said movable transducers to move the mirrors associated therewith into a position defining a path for said laser beams wherein bias is reduced for said detected temperature.

18. A system as in claim 17 wherein said control signal means comprises a look-up memory having data stored therein representative of drive signals necessary for said transducers for minimum bias for corresponding temperatures.

19. A system as in claim 17 wherein said control signal means comprises amplifying means having a precalibrated gain for generating said control signal in response to temperature detection.

20. A system as in claim 17 wherein said control signal means comprises a computer having a predetermined program stored therein for operating on said signal from said temperature detecting means in a predetermined manner to generate said control signal.

21. A system as in claim 20 further comprising an analog-to-digital temperature detecting means and the input of said computer and a digital-to-analog convertor arranged between the output of said computer and said selectively moveable transducers.

22. A system as in claim 18 further comprising an analog-to-digital convertor arranged between said temperature detecting means and the input of said look-up memory and a digital-to-analog convertor arranged between the output of said computer and said selectively movable transducers.

* * * * *